(12) United States Patent
Ungar

(10) Patent No.: US 6,327,701 B2
(45) Date of Patent: *Dec. 4, 2001

(54) METHOD AND APPARATUS FOR FINDING BUGS RELATED TO GARBAGE COLLECTION IN A VIRTUAL MACHINE

(75) Inventor: David Ungar, Palo Alto, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,382

(22) Filed: Sep. 15, 1998

(51) Int. Cl.[7] ........................................... G06F 9/45
(52) U.S. Cl. .................... 717/5; 717/4; 707/101; 707/103; 707/206
(58) Field of Search .................. 707/206, 103, 707/101; 717/4, 5

(56) References Cited

U.S. PATENT DOCUMENTS

| | | | |
|---|---|---|---|
| 4,775,932 | * 10/1988 | Oxley et al. | 707/206 |
| 4,797,810 | * 1/1989 | McEntee et al. | 364/200 |
| 4,989,134 | * 1/1991 | Shaw | 707/206 |
| 5,088,036 | 2/1992 | Ellis et al. . | |
| 5,355,483 | * 10/1994 | Serlet | 711/154 |
| 5,560,003 | * 9/1996 | Nilsen et al. | 707/206 |
| 5,590,332 | * 12/1996 | Baker | 717/5 |
| 5,652,883 | 7/1997 | Adcock . | |
| 5,687,368 | * 11/1997 | Nilsen | 707/103 |
| 5,692,185 | * 11/1997 | Nilsen et al. | 707/104 |
| 5,799,185 | 8/1998 | Watanabe . | |
| 5,819,304 | * 10/1998 | Nilsen et al. | 711/5 |
| 5,832,289 | * 11/1998 | Shaw et al. | 712/30 |
| 5,845,298 | * 12/1998 | O'Connor et al. | 707/206 |
| 5,873,105 | * 2/1999 | Tremblay et al. | 707/206 |
| 5,900,001 | * 5/1999 | Wolczko et al. | 707/206 |
| 5,903,900 | * 5/1999 | Knippel et al. | 707/206 |
| 5,909,579 | * 6/1999 | Agesen et al. | 717/4 |
| 5,915,255 | * 6/1999 | Schwartz et al. | 707/206 |
| 5,920,876 | * 7/1999 | Ungar et al. | 707/206 |
| 6,070,073 | * 5/2000 | Huber et al. | 707/206 |
| 6,081,665 | * 6/2000 | Nilsen et al. | 717/5 |
| 6,185,569 | * 2/2001 | East et al. | 707/101 |

OTHER PUBLICATIONS

Title: Space Efficient Conservative Garbage Collection Author: Boehm, ACM, 1993.*
Title: Garbage Collection for Strongly type languages using run–time type reconstruction, Aditya et al, ACM, 1994.*

* cited by examiner

Primary Examiner—Mark R. Powell
Assistant Examiner—Chameli C. Das
(74) Attorney, Agent, or Firm—The Hecker Law Group (57) ABSTRACT

A method and apparatus for finding bugs related to garbage collection in a virtual machine. For each possible garbage collection point in a stream of execution, a compiler in the virtual machine provides a map that specifies live pointer locations in the stack. In addition, the map identifies those locations in the stack that contain other forms of live data, such as integers. All other locations are considered "dead," i.e., no longer in use or never used. At each garbage collection point, "dead" locations in the stack are overwritten with an invalid pointer value. Because of the overwriting process, any bug in the compiler that causes a live pointer to be omitted from the map also causes the omitted pointer to be overwritten with the invalid pointer value. Regardless of whether garbage collection is actually performed at the garbage collection point where the pointer was omitted from the compiler-generated map, subsequent execution steps that reference the omitted pointer trigger an invalid pointer error. The invalid pointer error may be trapped and identified as a compiler bug related to map generation in the garbage collection process.

15 Claims, 8 Drawing Sheets

METHOD AND APPARATUS FOR FINDING BUGS RELATED TO GARBAGE COLLECTION IN A VIRTUAL MACHINE

BACKGROUND OF THE INVENTION

1. Field of the Invention

This invention relates to the field of computer systems, and, more specifically, to memory management garbage collection processes.

Sun, Sun Microsystems, the Sun logo, Java and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

An important aspect of memory management in any computer system is garbage collection. Garbage collection (GC) refers to the process of reclaiming portions of main memory that are no longer in use by the system or any running applications. In an object-oriented system, garbage collection is typically carried out to reclaim memory allocated to objects and other data structures (e.g., arrays, etc.) that are no longer referenced by an application. The reclaimed memory can then be re-allocated to store new objects or data structures.

In a Javat™ virtual machine, garbage collection is performed to reclaim memory space from a region of memory known as the heap. The heap is used to store objects and arrays that are referenced by pointers stored as local variables in activation records, or "stack frames," of a stack associated with an individual thread of execution in the virtual machine. The invocation of a method by a given thread results in the creation of a new stack frame that is "pushed" onto the stack of that thread. References to objects on the heap may be removed by an active (i.e., currently executing) method setting the respective pointer to a "null" value, or by removal of a respective stack frame in response to completion of its associated method.

In any thread of execution, there may be many garbage collection points, or "gc-points," where garbage collection can occur. However, actual garbage collection typically takes place at only a fraction of these possible gc-points each time the given thread of execution is run. In virtual machine implementations using a compiler, the compiler provides information at each gc-point about the set of locations in the stack frames that contain pointers to objects or arrays. Garbage collection is performed by determining which objects and arrays in the heap are referenced from within the set of locations specified by the compiler, and reclaiming those objects and arrays that are no longer referenced.

Unfortunately, the compiler may have an error (i.e., a "bug") that causes a stack location to be mistakenly omitted from the specified set of pointer locations. This type of compiler bug can result in the reclaiming of an object or array when a reference still exists. Also, for a type of garbage collection known as "copying" garbage collection, this compiler bug may result in a failure to update a pointer reference to point to the appropriate copy of the associated object or array. In either case, future references made to the object or array through the omitted stack location can result in improper execution of an application. This bug is garbage collection-related, but it may appear to be a code generation bug, making detection and correction difficult.

To provide a better understanding of the problems associated with garbage collection in a virtual machine, an overview of garbage collection techniques is provided below.

Garbage Collection

Garbage collection may be either conservative or exact. Conservative garbage collection involves scanning memory space for stored values that match the address of an object (or other memory structure) that is being considered for collection. If a matching value is not found in the memory being scanned, then no references to the object exist, and the object may be safely collected. If a matching value is found, it is assumed that the value is a reference (e.g., a pointer) to the object under consideration, and the object is not collected. This assumption means that an object is not collected even if the matching memory value is not a reference to the object, but rather a data value that coincidentally matches the base address of the object.

In exact garbage collection, only true references (pointers) are considered in a scan, so coincidentally matching data values are ignored in the collection process. This means that an object without any associated references is always considered garbage in a scan, and more efficient collection is achieved. However, to perform exact garbage collection, the scanning process must have information regarding which memory locations contain live references (i.e., active, non-null references). Only those memory locations containing live references are scanned to determine reference matches for objects under consideration for collection.

To provide more efficient use of memory space in terms of compaction, "copying" garbage collection is commonly implemented. In copying garbage collection, the memory space is divided into regions and an object transfer is performed. When garbage collection is carried out, objects in a portion of memory referred to as "from" space are copied to a portion referred to as "to" space. Those objects in "from" space that are considered "garbage" by the scan process are not copied to "to" space. The process of copying the objects results in reduced fragmentation of the memory space and better compaction.

Figure 1:
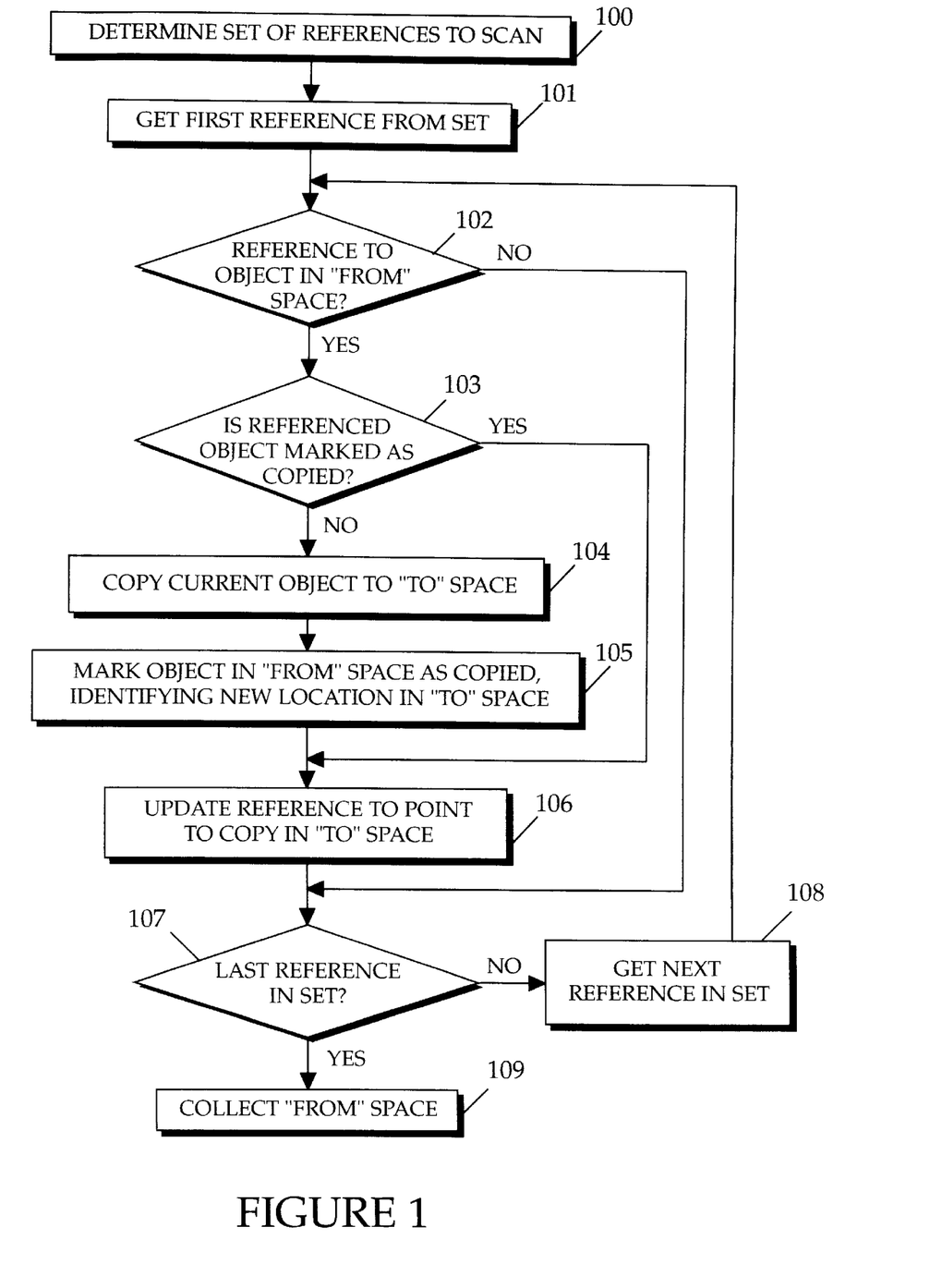
FIG. 1 is a flow diagram of a copying garbage collection process.

FIG. 1 is a flow diagram illustrating a copying garbage collection process. In step 100, the set of references to be scanned is determined. For example, a mechanism may be provided that tracks the creation of references, and maintains a list of current references for exact garbage collection. This list may be used to define the set to be scanned in step 100. In step 101, the garbage collection process obtains the first reference from the set of references. In step 102, the reference is analyzed to determine if the reference points to an object in "from" space. If the reference does not point to an object in "from" space, the process jumps to step 107. If, however, the reference does point to an object in "from" space, the process continues at step 103.

In step 103, the referenced object in "from" space is examined to determine whether the object is marked as copied. If the referenced object is marked, the process jumps to step 106. However, if the referenced object in "from" space is not marked as copied, the process continues at step 104, in which the referenced object is copied into "to" space. In subsequent step 105, the referenced object in "from" space is marked as copied (e.g., replaced with a marker), with the location of the new copy in "to" space identified in the marker. In step 106, the current reference is updated to point to the location of the new copy of the object in "to"

space, as identified by the marked object in "from" space. The process continues in step 107.

In step 107, a check is performed to determine whether the current reference is the last reference in the set of references to be scanned. If the current reference is not the last reference, in step 108, the next reference in the set is obtained, and the process returns to step 102. If, however, in step 107, the current reference is the last reference in the set, the process completes in step 109 where "from" space is collected in its entirety. Ideally, no references will be made in the future to objects in "from" space. In a subsequent garbage collection, "from" space becomes "to" space and "to" space becomes "from" space for purposes of copying.

The copying garbage collection scheme described above may be expanded to implement a generational approach. Generational collection schemes are predicated on the general assumption that newly created objects are more prone to collection than objects that have survived several garbage collection cycles. Using the generational approach, objects are segregated into generational groups of objects according to the number of garbage collection cycles survived, with each generational group having its own respective "to" space and "from" space. Garbage collection is then carried out separately for each generational group of objects, with garbage collection being carried out more frequently for younger generations.

Exact garbage collection is required when objects are copied, to prevent a coincidental data value match from causing mutation of the data value during updating of object references. As stated previously, exact garbage collection requires information about which locations contain active or "live" references to objects. Problems can arise when this information is incorrect. For example, if a live reference fails to be identified in step 100 of FIG. 1 due to misidentification of a live reference, the garbage collection process may erroneously collect the associated object without copying, causing unpredictable performance when the reference is used by a method to access the object in the future.

Also, if the associated object is copied to "to" space (e.g., because other references to the object exist and are correctly identified), the misidentified reference is not updated in step 106 to refer to the new object copy. Thus, while object access through other identified references will address the new object copy, object access through the misidentified reference will continue to address the obsolete object with unknown and undesirable consequences. This undesirable behavior will appear as a code generation bug associated with the executing application, when it is in fact associated with garbage collection, and more specifically associated with the component that provides the information about live object references.

In the prior art, stress tests have been performed to test for execution bugs. Stress tests attempt to test extreme execution conditions that will result in the triggering and resulting detection of any bugs in the system. However, with respect to garbage collection, a stress test will only result in testing at gc-points where garbage collection actually occurs. Because garbage collection occurs at only a subset of gc-points, and because that subset of gc-points may not differ from one execution to the next for a particular application or input data set, stress tests are insufficient to reliably and exhaustively find bugs associated with the misidentification of a live reference at possibly a single gc-point out of many in the execution of the application. Further, with respect to a virtual machine environment where a compiler identifies the live references for applications it compiles, a stress testing application may be insufficient to bring about conditions that will result in misidentification of a stack location by the compiler, whereas another application may consistently trigger such a bug in the compiler.

SUMMARY OF THE INVENTION

A method and apparatus for finding bugs related to garbage collection in a virtual machine are described. For each possible garbage collection point in a stream of execution, a compiler in the virtual machine provides a map that specifies live pointer locations in the stack. In addition, the map identifies those locations in the stack that contain other forms of live data, such as integers. All other locations are considered "dead," i.e., no longer in use or never used. At each garbage collection point, "dead" locations in the stack are overwritten with an invalid pointer value. Because of the overwriting process, any bug in the compiler that causes a live pointer to be omitted from the map also causes the omitted pointer to be overwritten with the invalid pointer value. Regardless of whether garbage collection is actually performed at the garbage collection point where the pointer was omitted from the compiler-generated map, subsequent execution steps that reference the omitted pointer trigger an invalid pointer error. The invalid pointer error may be trapped and identified as a compiler bug related to map generation in the garbage collection process.

DETAILED DESCRIPTION OF THE INVENTION

The invention is a method and apparatus for finding bugs related to garbage collection in a virtual machine. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Though discussed herein with respect to the Java programming language and the Java virtual machine, the invention may be implemented in any environment that supports object or data access through references, and that provides information about live object references for use in garbage collection.

In virtual machines that implement compiling of bytecode input, such as the Java virtual machine, the component providing the information about live object references is the compiler. The compiler is responsible for compiling method code, and is therefore knowledgeable about the contents of stack frames at garbage collection points. An embodiment of a processing environment and virtual machine implementation are more fully described below.

The Processing Environment

The processing environment of the Java programming language is object-oriented in nature. To provide a better understanding of object-oriented principles, an overview of object-oriented programming follows.

1. Object-Oriented Programming

Object-oriented programming is a method of creating computer programs by combining certain fundamental building blocks, and creating relationships among and between the building blocks. The building blocks in object-oriented programming systems are called "objects." A software application can be written using an object-oriented programming language whereby the program's functionality is implemented using these objects.

An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and zero or more arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. An example of a class-based object-oriented programming scheme is generally described in "Smalltalk-80: The Language," by Adele Goldberg and David Robson, published by Addison-Wesley Publishing Company, 1989.

An object class provides a definition for an object which typically includes both fields (e.g., variables) and methods. An object class is used to create a particular object "instance." (The term "object" by itself is often used interchangeably to refer to a particular class or a particular instance.) An instance of an object class includes the variables and methods defined for that class. Multiple instances can be created from the same object class. Each instance that is created from the object class is said to be of the same type or class.

To illustrate, an employee object class can include "name" and "salary" instance variables and a "set_salary" method. Instances of the employee object class can be created, or instantiated, for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages, such as the Java programming language, support only single inheritance, where a subclass is limited to inheriting the class definition of only one parent class. The Java programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

2. Programming and Execution

Java applications typically comprise one or more object classes and interfaces. Unlike many programming language in which a program compiled into machine-dependent, executable program code, classes written in the Java programming language are compiled into machine independent bytecode class files. Each class contains code and data in a platform-independent format called the class file format. The computer system acting as the execution vehicle contains a program called a virtual machine, which is responsible for executing the code in each class.

Applications may be designed as standalone Java applications, or as Java "applets" which are identified by an applet tag in an HTML (hypertext markup language) document, and loaded by a browser application. The class files associated with an application or applet may be stored on the local computing system, or on a server accessible over a network. Each class is loaded into the Java virtual machine, as needed, by the "class loader."

To provide a client with access to class files from a server on a network, a web server application is executed on the server to respond to HTTP (hypertext transport protocol) requests containing URLs (universal resource locators) to HTML documents, also referred to as "web pages." When a browser application executing on a client platform receives an HTML document (e.g., as a result of requesting an HTML document by forwarding a URL to the web server), the browser application parses the HTML and automatically initiates the download of the specified bytecode class files when it encounters an applet tag in the HTML document.

The classes of a Java applet are loaded on demand from the network (stored on a server), or from a local file system, when first referenced during the Java applet's execution. The virtual machine locates and loads each class file, parses the class file format, allocates memory for the class's various components, and links the class with other already loaded classes. This process makes the code in the class readily executable by the virtual machine.

Figure 2:
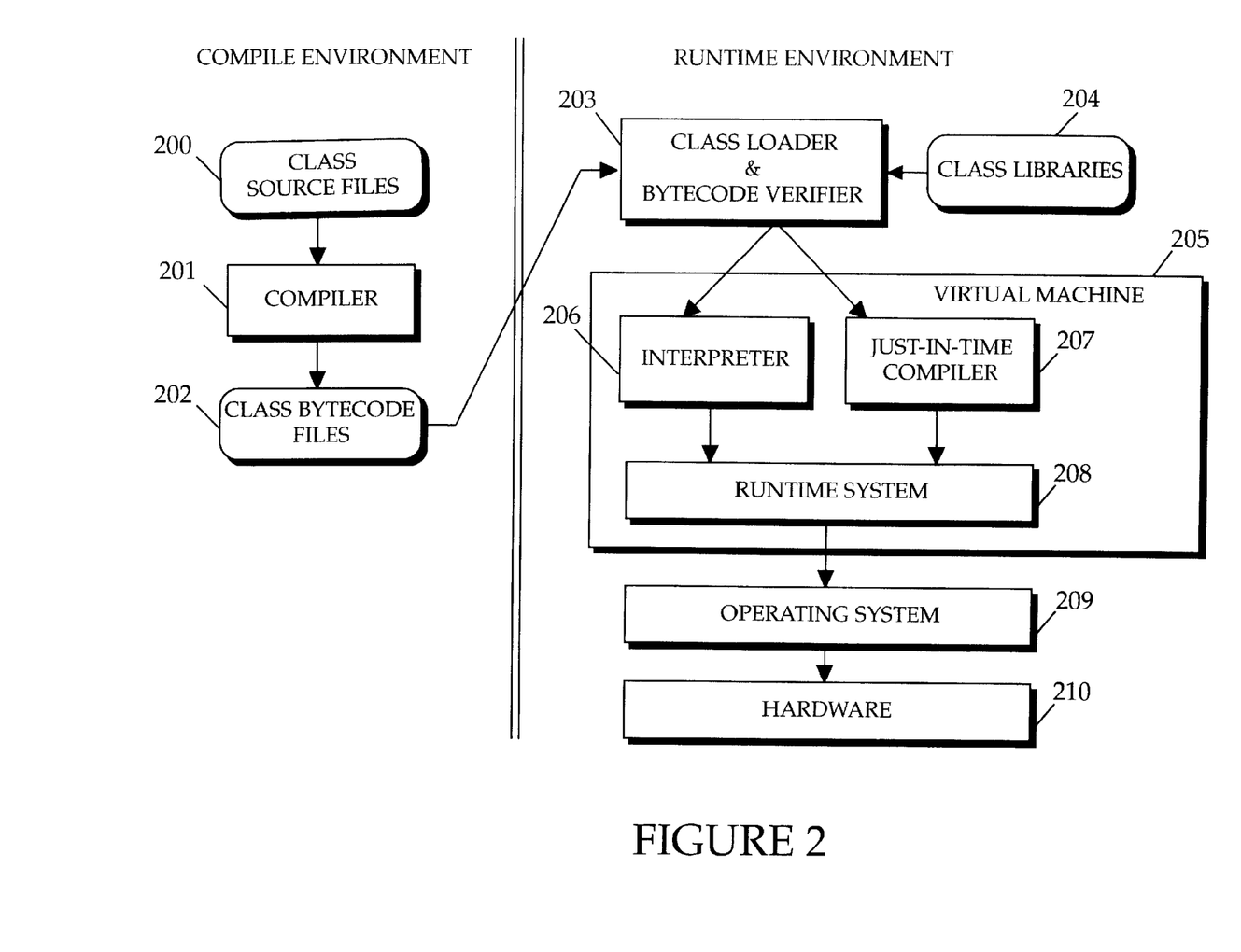
FIG. 2 is a block diagram of compile and runtime environments.

FIG. 2 illustrates the compile and runtime environments for a processing system. In the compile environment, a software developer creates source files 200, which contain the programmer readable class definitions written in the Java programming language, including data structures, method implementations and references to other classes. Source files 200 are provided to Java compiler 201, which compiles source files 200 into compiled ".class" files 202 that contain bytecodes executable by a Java virtual machine. Bytecode class files 202 are stored (e.g., in temporary or permanent storage) on a server, and are available for download over a network. Alternatively, bytecode class files 202 may be stored locally in a directory on the client platform.

The Java runtime environment contains a Java virtual machine (JVM) 205 which is able to execute bytecode class files and execute native operating system ("O/S") calls to operating system 209 when necessary during execution. Java virtual machine 205 provides a level of abstraction between the machine independence of the bytecode classes and the machine-dependent instruction set of the underlying computer hardware 210, as well as the platform-dependent calls of operating system 209.

Class loader and bytecode verifier ("class loader") 203 is responsible for loading bytecode class files 202 and supporting class libraries 204 into Java virtual machine 205 as needed. Class loader 203 also verifies the bytecodes of each class file to maintain proper execution and enforcement of security rules. Within the context of runtime system 208, either an interpreter 206 executes the bytecodes directly, or a "just-in-time" (JIT) compiler 207 transforms the bytecodes into machine code, so that they can be executed by the processor (or processors) in hardware 210.

The runtime system 208 of virtual machine 205 supports a general stack architecture. The manner in which this general stack architecture is supported by the underlying hardware 210 is determined by the particular virtual machine implementation, and reflected in the way the bytecodes are interpreted or JIT-compiled. Other elements of the runtime system include thread management (e.g., scheduling) and garbage collection mechanisms.

Figure 3:
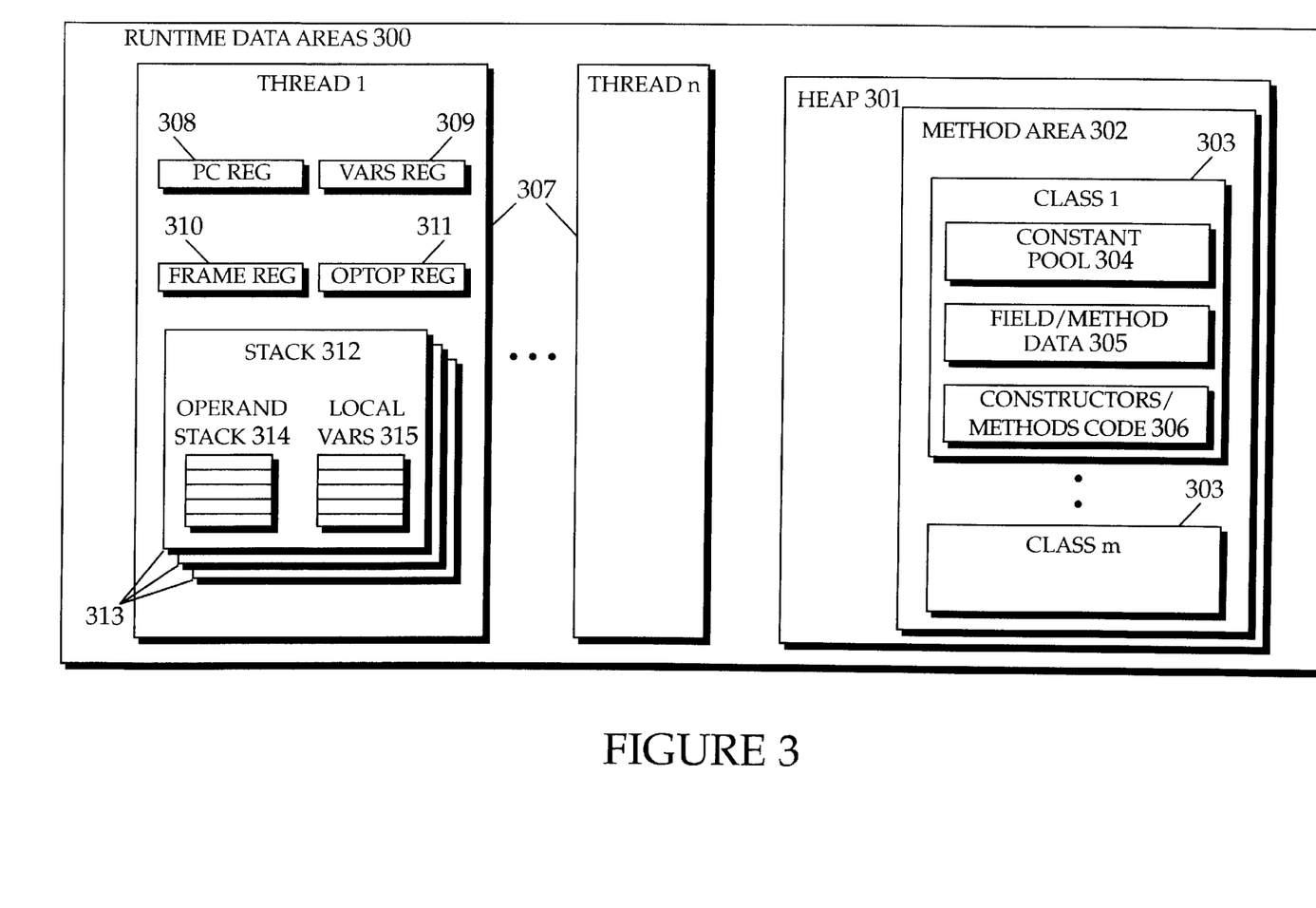
FIG. 3 is a block diagram of the runtime data areas of an embodiment of a virtual machine.

FIG. 3 illustrates runtime data areas which support the stack architecture within runtime system 208. In FIG. 3, runtime data areas 300 comprise one or more thread-based data areas 307. Each thread-based data area 307 comprises a program counter register (PC REG) 308, a local variables pointer register (VARS REG) 309, a frame register (FRAME REG) 310, an operand stack pointer register (OPTOP REG) 311, and a stack 312. Stack 312 comprises one or more frames 313 which contain an operand stack 314 and local variables 315. Separate frame formats may be implemented for interpreted code and compiled code.

Runtime data areas 300 further comprises shared heap 301. Heap 301 is the runtime data area from which memory for all class instances and arrays is allocated. Shared heap 301 comprises method area 302, which is shared among all threads. Method area 302 comprises one or more class-based data areas 303 for storing information extracted from each loaded class file. For example, class-based data area 303 may comprise class structures such as constant pool 304, field and method data 305, and code for methods and constructors 306. Methods access class structures by reference. Pointers to classes are stored in local variables 315 or in registers associated with a given stack.

A virtual machine can support many threads of execution at once. Each thread has its own thread-based data area 307. At any point, each thread is executing the code of a single method, the "current method" for that thread. The program counter register 308 contains the address of the virtual machine instruction currently being executed. Frame register 310 points to the location of the current method in method area 302.

Each thread has a private stack 312, created at the same time as the thread. Stack 312 stores one or more frames 313 associated with methods invoked by the thread. Frames 313 are used to store data and partial results, as well as to perform dynamic linking, return values for methods and dispatch exceptions. A new frame is created and pushed onto the stack each time a method is invoked, and an existing frame is popped from the stack and destroyed when its method completes. A frame that is created by a thread is local to that thread and typically cannot be directly referenced by any other thread.

Only one frame, the frame for the currently executing method, is active at any point in a given thread of control. This frame is referred to as the "current frame," and its method is known as the "current method." A frame ceases to be current if its method invokes another method or if its method completes. When a method is invoked, a new frame is created and becomes current when control transfers to the new method. On method return, the current frame passes back the results of its method invocation, if any, to the previous frame. The current frame is then discarded while the previous frame becomes the current one.

Each frame 313 has its own set of local variables 315 and its own operand stack 314. The local variables pointer register 309 contains a pointer to the base of an array of words containing local variables 315 of the current frame. The operand stack pointer register 311 points to the top of operand stack 314 of the current frame. Most virtual machine instructions take values from the operand stack of the current frame, operate on them, and return results to the same operand stack. Operand stack 314 is also used to pass arguments to methods and receive method results.

Figure 4A:
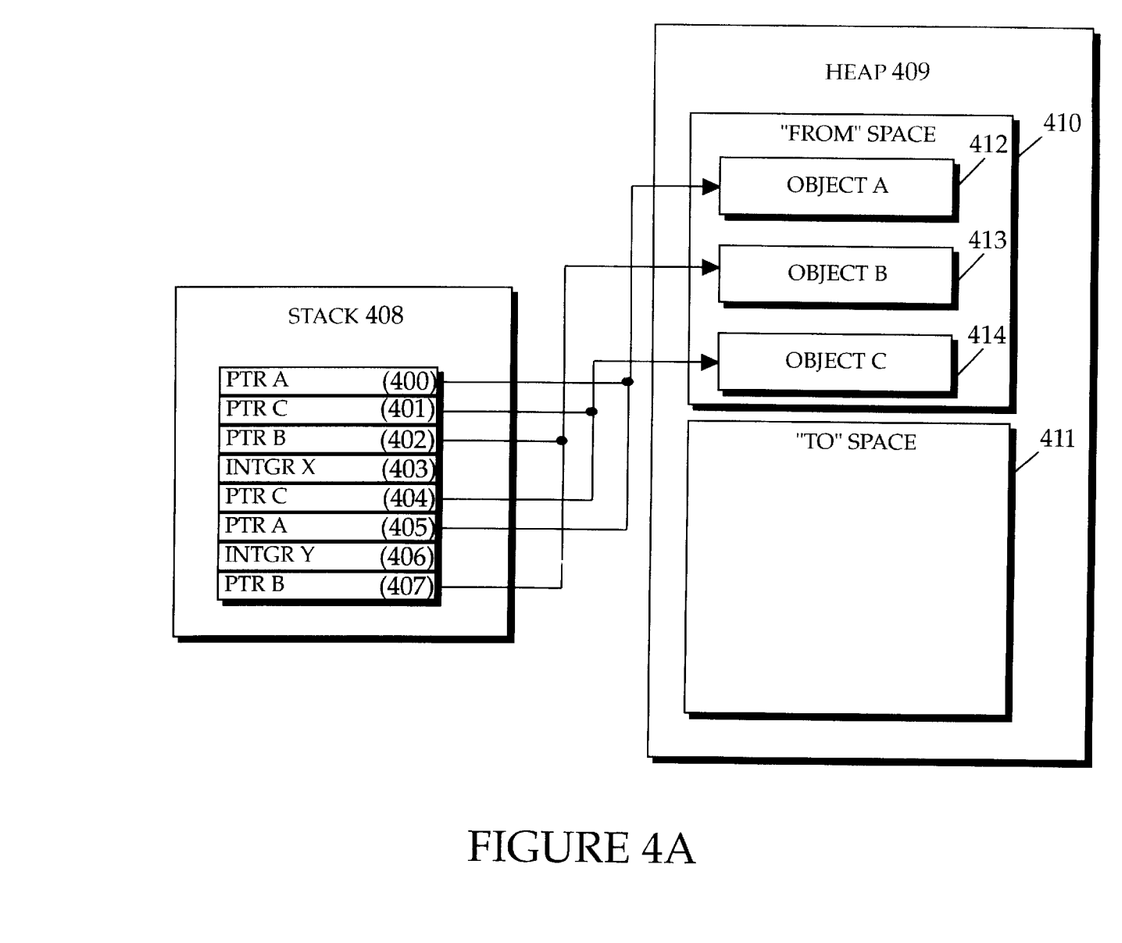
FIG. 4A is a block diagram illustrating an example of the use of pointers on a stack to reference objects on a heap.

FIG. 4A is a block diagram illustrating the use of pointers on the stack to reference objects on the heap in a virtual machine. The data structures shown include stack 408 comprising stack locations 400–407, and heap 409 comprising "from" space 410 and "to" space 411. "From" space 410 comprises object A (412), object B (413) and object C (414). FIG. 4 illustrates the state of the stack and heap prior to a garbage collection cycle, so no objects are shown copied to "to" space 411.

For purposes of example, stack locations 400–407 appear as a single array of local variables. However, in actual application, each stack frame contains its own set of local variables. Further, pointers to objects may be stored in registers as well. Stack locations 400–407 may therefore represent registers and local variables associated with multiple stack frames.

When an object is instantiated by invocation of a class constructor, and the object is assigned to a local variable, it is the pointer to the object that is stored in the local variable on the stack 408. As examples, stack locations 400 and 405 contain references to object A in the form of a pointer value. Similarly, stack locations 401 and 404 contain references to object C, and stack locations 402 and 407 contain references to object B. Local variables and registers in stack frames may also contain actual data, i.e., data that is not indirectly referenced, such as integer data. For example, stack locations 403 and 406 contain integers X and Y, respectively.

Figure 4B:
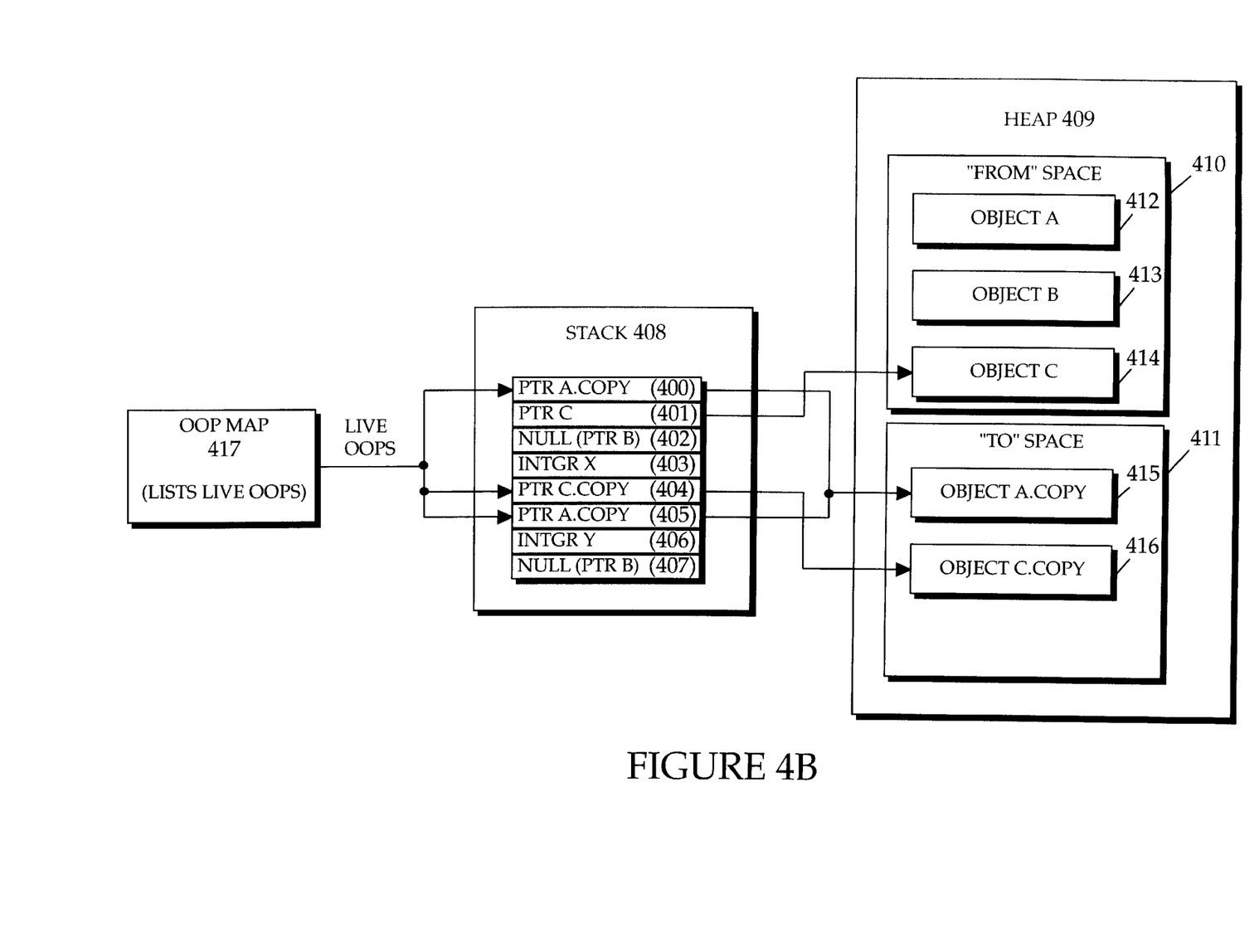
FIG. 4B is a block diagram illustrating the application of copying garbage collection to the stack and heap example of FIG. 4A.

FIG. 4B illustrates the stack and heap of FIG. 4A after a garbage collection cycle has taken place at a gc-point in the virtual machine's execution of a program. It is assumed in FIG. 4B that prior to garbage collection, the references to object B were explicitly released by a method assigning a "null" value to the respective local variables 402 and 407. During compiling of the program code, the compiler of the virtual machine prepares a map of stack locations containing live pointers. An updated map is generated by the compiler for each gc-point. In FIG. 4B, the map generated by the compiler for the recent gc-point is OOP map 417 (OOP referring to object-oriented pointers) which indicates that stack locations 400, 404 and 405 contain live OOPs or pointers. In this example, stack location 401 is erroneously omitted from the live OOPs designated by OOP map 417.

In carrying out garbage collection, references to object A were found in stack locations 400 and 405, and a reference to object C was found in stack location 404. No references to object B were found in the stack locations of stack 408, because locations 402 and 407 were assigned null values and/or were not specified by OOP map 417 as live pointers. As a result, objects A and C are copied to "to" space 411 as object A.copy 415 and object C.copy 416. Further, using OOP map 417 to determine the locations of the live pointers, stack locations 400 and 405 are updated to point to object A.copy 415 in "to" space 411, and stack location 404 is updated to point to object C.copy 416.

Unfortunately, due to its omission from OOP map 417, stack location 401 is not updated. Therefore, any future reference to object C made via stack location 401 will erroneously access the obsolete object C 414 in "from" space 410, whereas reference made via stack location 404 will access object C.copy 416 appropriately. The multiple copies of object C are likely to diverge in respective data values over time, causing inconsistent performance. Also, obsolete object C 414 may be written over in a subsequent garbage collection cycle, resulting in indeterminate behavior and possibly a terminal error if accessed via stack location 401.

Zapping of Stack Locations in Debugging Mode

A debugging mode is provided in an embodiment of the invention, that, when enabled, initiates a debugging process within the virtual machine to find bugs associated with compiler error in the identification of live OOPs. The activation of the debugging mode enables a "zapping" process that overwrites unused stack locations at each gc-point in the virtual machine's execution of a program. Those stack locations that the compiler fails to correctly identify as live OOPs are also overwritten by the zapping process. As a result, during program execution, attempted object access via a misidentified live OOP generates an error that may be trapped and identified. The zapping process takes place at each gc-point, thus providing an exhaustive test of compiler OOP identification for a given executed application.

The OOP map generated by the compiler is extended in debugging mode to identify live stack locations that do not contain OOPS. This permits the zapping process to identify unused stack locations as those locations which are not identified by the compiler either as live OOPS or as live non-OOPs (e.g., directly referenced data such as integers).

In one embodiment of the invention, a comparison process is carried out, in addition to the zapping process, to handle another possible form of misidentification that may occur in the revised OOP map. This new form of misidentification is that of a live OOP being misidentified as a live non-OOP. If a live OOP is misidentified in this manner, the zapping process assumes that the register location contains a live non-OOP value, such as an integer, and thus does not overwrite the register location. However, in the additional comparison process, live non-OOPs are compared with possible OOP values (e.g., valid object reference values) to ascertain whether the live non-OOPs may, in fact, be misidentified live OOPs. If a match is obtained for any live non-OOP, a warning is issued. The person performing the debugging process may then determine where a possible bug of this nature may be occurring based on the issued warning.

Where actual OOP values are intentionally being manipulated in the form of live non-OOPs, these warnings may be ignored. Screening capability may be built into the compiler and/or comparison process to track where live OOP values have been written intentionally as live non-OOPs. The comparison process may then automatically omit a comparison operation, and subsequent warning issuance, at the register locations of tracked live non-OOPs.

Figure 5:
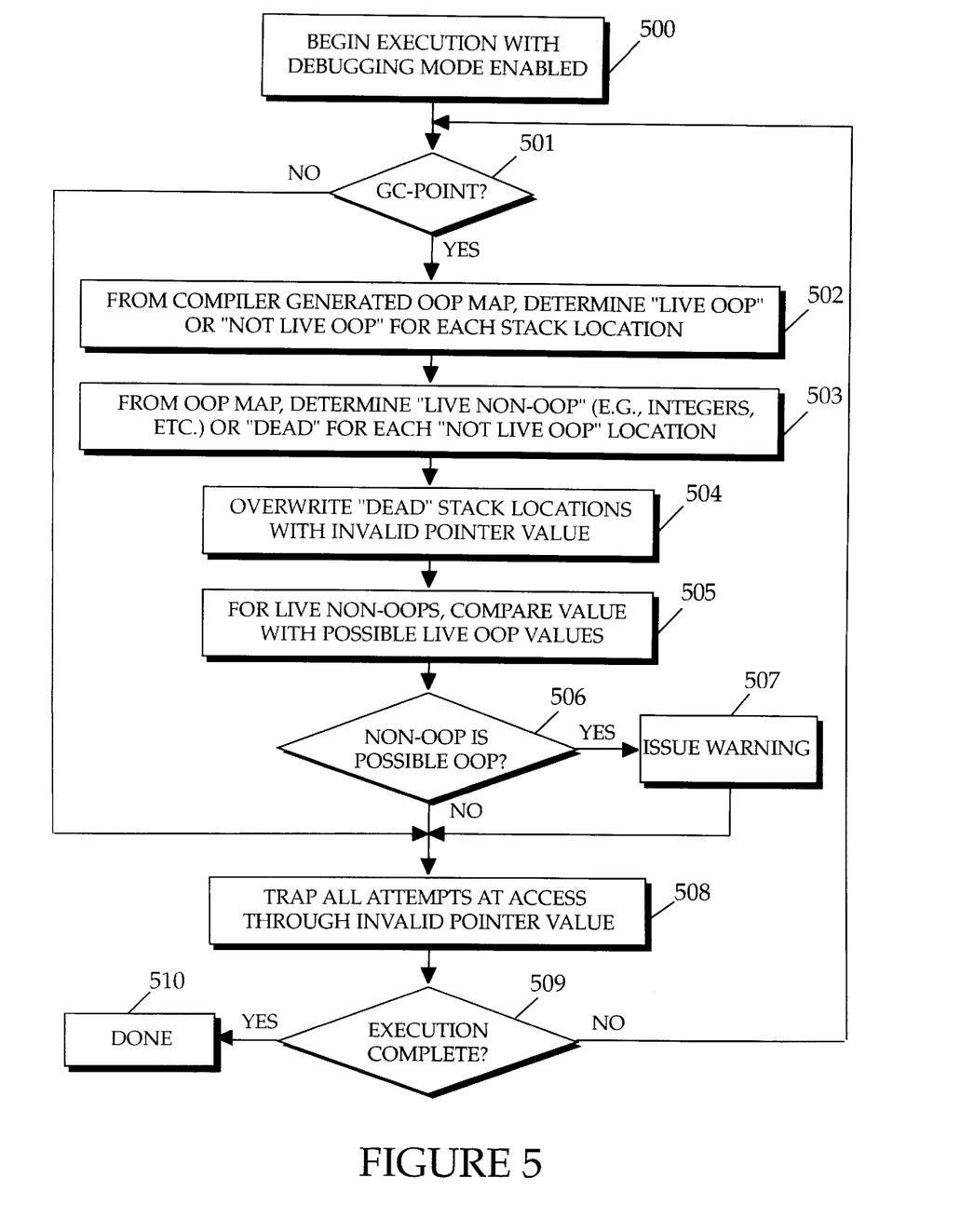
FIG. 5 is a flow diagram, in accordance with an embodiment of the invention, of a process for finding bugs related to garbage collection in a virtual machine.

FIG. 5 is a flow diagram of a debugging process in accordance with an embodiment of the invention. In step 500, the debugging mode is enabled and the virtual machine begins execution of an application. At step 501, a branch occurs based on whether a gc-point has been reached. If execution is not at a gc-point, the debugging process continues at step 508, where any attempts to use an invalid pointer value during program execution are trapped. If, at step 501, execution has reached a gc-point, the debugging process continues at step 502.

In step 502, the debugging process determines, based on the compiler OOP map, which stack locations contain a live OOP and which stack locations do not contain a live OOP. In step 503, for those stack locations specified as not containing live OOPs, the process determines which stack locations contain other forms of live data, or live non-OOPs. Those stack locations that are not identified by the compiler OOP map as containing live OOPs or live non-OOPs are assumed to be "dead" or unused locations. In step 504, those dead or unused stack locations are overwritten with an invalid pointer value, such as "0000." Steps 501–504 may be implemented by the zapping process previously described.

In the embodiment of FIG. 5, in step 505, those locations specified as live non-OOPs (or a subset thereof) in the OOP map are compared with possible object reference values to determine whether each live non-OOP is possibly a misidentified live OOP. If, in step 506, no live non-OOP matches a reference to an object, the debugging process continues at step 508. If, in step 506, the value stored in a live non-OOP matches a possible pointer value of an object, a warning is issued in step 507 before proceeding to step 508. The warning may comprise, for example, a dialog message sent to a display, or a warning entry written to a log file. Steps 505–507 may be implemented by the comparison process previously described. It will be obvious to one skilled in the art that the invention may be practiced without steps 505–507.

In step 508, during program execution, any attempts to use invalid pointers (i.e., pointers with invalid pointer values such as "0000") to access objects on the heap are trapped, or otherwise registered as errors, and identified. The step of trapping the use of invalid pointers is carried out continuously during program execution, and may be implemented in a virtual machine process separate from the zapping and comparison process(es). In step 509, if program execution is completed, the debugging process also completes in step 510. If, in step 509, execution has not yet completed, the debugging process returns to step 501.

Figure 6:
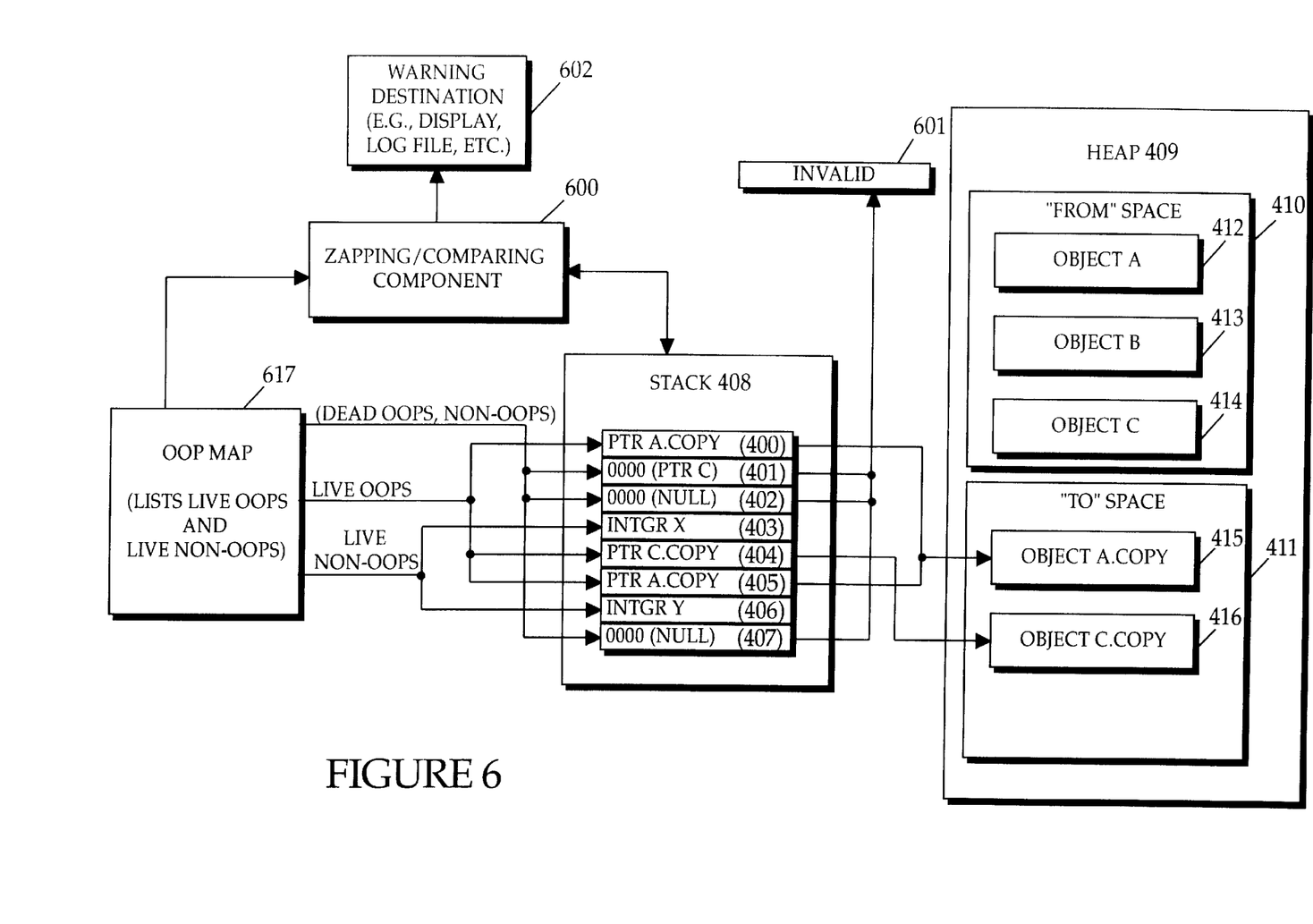
FIG. 6 is a block diagram, in accordance with an embodiment of the invention, of apparatus for finding bugs related to garbage collection.

FIG. 6 is a block diagram of a virtual machine implementation comprising a zapping/comparing component 600 in accordance with an embodiment of the invention. Zapping/comparing component 600 performs the zapping and comparison processes described with respect to FIG. 5, and may be implemented as one or more objects, components, methods, procedures, or elements thereof, within a virtual machine environment.

In FIG. 6, stack 408 comprises stack locations 400–407 and heap 409 comprises "from" space 410 and "to" space 411. "From" space 410 comprises object A 412, object B 413 and object C 414. "To" space 411 comprises object A.copy 415 and object B.copy 416. Stack locations 400 and 405 point to object A.copy 415; stack location 404 points to object C.copy 416; and stack locations 401, 402 and 407 point to an invalid address 601.

Compiler-generated OOP map 617 identifies stack locations 400, 404 and 405 as live OOPs. Further, in accordance with an embodiment of the invention, OOP map 617 identifies stack locations 403 and 406 as live non-OOPs, because they contain integer data values. An example representation of OOP map 617 is as follows:

| Stack Location* | | |
|---|---|---|
| 400 | Live OOP | — |
| 401 | (Not Live OOP) | (Dead) |
| 402 | (Not Live OOP) | (Dead) |
| 403 | (Not Live OOP) | Live Non-OOP |
| 404 | Live OOP | — |
| 405 | Live OOP | — |
| 406 | (Not Live OOP) | Live Non-OOP |
| 407 | (Not Live OOP) | (Dead) |

*register or local variable

The implementation of the OOP map may be as flag bits or bytes associated with stack locations. A first bit or byte may be used to indicate whether the corresponding stack location is a Live OOP. A second bit or byte may be used to indicate, in the event the first bit or byte is not set, whether the corresponding stack location is a live non-OOP. Any map implementation may be used which provides three states for each stack location: "Live OOP," "Live non-OOP," and "dead."

Zapping/comparing component 600 accesses OOP map 617 to identify "dead" locations in stack 408 for the zapping process and to identify "Live Non-OOP" locations for the comparing process. Zapping/comparing component 600 accesses stack 408 to carry out the overwriting operations of the zapping process, as well as the individual comparing operations of the comparison process. When directed by the comparison process, zapping/comparing component 600 may issue warnings to warning destination 602.

In this example, stack locations 401, 402 and 407 are overwritten with the pointer value 0000, which points to invalid location 601. The zapping of stack locations 402 and 407 results in no effect because those locations are dead stack locations previously assigned a null value. The zapping of stack location 401, however, redirects the unidentified OOP from object C 414 to invalid location 601. Attempted access of object C via stack location 401 results in a trap that may be used to detect the error in the OOP map, and to correct the source of the error in the compiler.

The overwriting of stack location 401 occurs at the gc-point regardless of whether garbage collection actually takes place. Thus, even in execution situations where, due to the absence of a garbage collection cycle, an error in the OOP map does not result in a pointer error, the zapping process overwrites misidentified stack locations to force a pointer error to occur and be trapped.

If the entry for location 401 in the OOP map were to erroneously identify the location as containing a live non-OOP rather than a "dead" value, the entry for location 401 in OOP map 617 would read, for example, as follows:

| | | |
|---|---|---|
| 401 | (Not Live OOP) | Live Non-OOP |

In this case, the zapping process of zapping/comparing component 600 does not overwrite location 401 because the location is not "dead." However, the comparison process of zapping/comparing component 600 examines locations identified as "Live Non-OOP" (e.g., locations 401, 403 and 406), and compares the stored values with possible OOP reference values. Location 401 is flagged for storing a value matching the OOP reference value for object C 414 in "from" space 410, and a warning is issued to warning destination 602 to note the occurrence of this match. As with the zapping process, the comparison process is carried out at each gc-point. Thus, a warning may be issued by zapping/comparing component 600 regardless of whether a garbage collection cycle is carried out.

Embodiment of Computer Execution Environment (Hardware)

Figure 7:
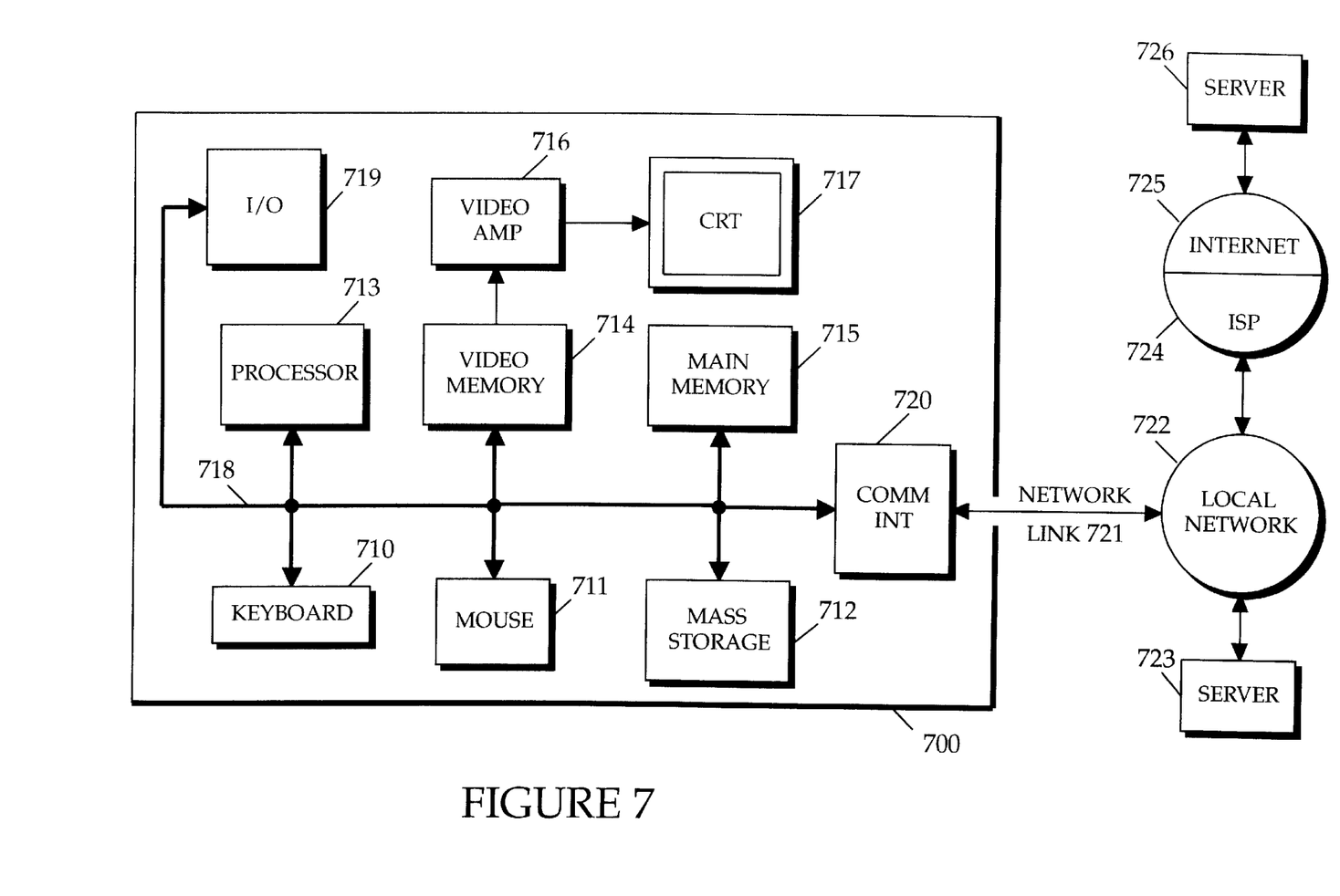
FIG. 7 is a block diagram of one embodiment of a computer system capable of providing a suitable execution environment for an embodiment of the invention.

An embodiment of the invention can be implemented as computer software in the form of computer readable code executed on a general purpose computer such as computer 700 illustrated in FIG. 7, or in the form of bytecode class files executable within a Java runtime environment running on such a computer. A keyboard 710 and mouse 711 are coupled to a bi-directional system bus 718. The keyboard and mouse are for introducing user input to the computer system and communicating that user input to processor 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 700 includes a video memory 714, main memory 715 and mass storage 712, all coupled to bi-directional system bus 718 along with keyboard 710, mouse 711 and processor 713. The mass storage 712 may include both fixed and removable media, such as magnetic, optical or magnetic optical storage systems or any other available mass storage technology. Bus 718 may contain, for example, address lines for addressing video memory 714 or main memory 715. The system bus 718 also includes, for example, a data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images. Alternatively, the video memory could be used to drive a flat panel or liquid crystal display (LCD), or any other suitable data presentation device.

Computer 700 may also include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Communication interface 720 could also be a cable modem or wireless interface. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by an Internet Service Provider (ISP) 724. ISP 724 in turn provides data communication services through the world wide packet data communication network now commonly referred to as the "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Computer 700 can send messages and receive data, including program code, through the network(s), network link 721, and communication interface 720. In the Internet example, remote server computer 726 might transmit a requested code for an application program through Internet 725, ISP 724, local network 722 and communication interface 720.

The received code may be executed by processor 713 as it is received, and/or stored in mass storage 712, or other non-volatile storage for later execution. In this manner, computer 700 may obtain application code in the form of a carrier wave. In accordance with an embodiment of the invention, an example of such a downloaded application is the apparatus for debugging a virtual machine described herein.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

Thus, a method and apparatus for finding bugs related to garbage collection in a virtual machine have been described in conjunction with one or more specific embodiments. The invention is defined by the claims and their full scope of equivalents.

What is claimed is:

1. In a computer system, a method for finding program code bugs comprising:

obtaining a map of a plurality of pointers to live objects and data;

determining memory locations that do not contain at least one of said plurality of pointers based on a said map;

overwriting said memory locations with an invalid pointer value; and issuing a warning if a resource attempts to access one of said memory locations containing said invalid pointer value.

2. The method of claim 1, further comprising implementing a trap for a reference made via said invalid pointer value.

3. The method of claim 1, further comprising generating said map in a compiler.

4. The method of claim 1, wherein said method is implemented within a virtual machine environment.

5. The method of claim 1 wherein said memory location comprises a register or local variable of a stack.

6. The method of claim 1, wherein said step of issuing a warning comprises logging said warning in a log file.

7. The method of claim 1, wherein said step of issuing a warning comprises displaying a warning dialog on a display device.

8. A computer program product comprising:

a computer usable medium having computer readable code embodied therein for debugging a garbage collection process, said computer program product comprising:

computer readable code configured to cause a computer to obtain a map of a plurality of pointers to live objects and data;

computer readable code configured to cause a computer to determine memory locations that do not contain at least one of said plurality of pointers based on said map;

computer readable code configured to cause a computer to overwrite said memory locations with an invalid pointer value; and computer readable code configured to cause a computer to issue a warning if a resource attempts to access one of said memory locations containing said invalid pointer value.

9. The computer program product of claim 8, further comprising computer readable code configured to cause a computer to implement a trap for a reference made via said invalid pointer value.

10. The computer program product of claim 8, further comprising computer readable code configured to cause a computer to generate said map in a compiler.

11. The computer program product of claim 8, wherein said computer readable code is configured to be executed within a virtual machine environment.

12. The computer program product of claim 8 wherein said memory location comprises a register or local variable of a stack.

13. The computer program product of claim 8, wherein said computer readable code configured to cause a computer to issue a warning comprises computer readable code configured to cause a computer to log said warning in a log file.

14. The computer program product of claim 8, wherein said computer readable code configured to cause a computer to issue a warning comprises computer readable code configured to cause a computer to display a warning dialog on a display device.

15. A virtual machine comprising:
- means for obtaining a map of a plurality of pointers to live objects and data;
- means for determining memory locations that do not contain at least one of said plurality of pointers based on said map;
- means for overwriting said memory locations with an invalid pointer value; and
- means for issuing a warning if a resource attempts to access one of said memory locations containing said invalid pointer value.

* * * * *